United States Patent [19]

Ingvason

[11] Patent Number: 4,658,746
[45] Date of Patent: Apr. 21, 1987

[54] SEAGOING VESSEL HAVING A BULB

[76] Inventor: Sigurdur Ingvason, Gärdesvägen 31, 430 80 Hovås, Sweden

[21] Appl. No.: 763,993

[22] Filed: Aug. 9, 1985

[51] Int. Cl.[4] ............................................. B63B 1/06
[52] U.S. Cl. .................................... 114/56; 114/284; 114/67 R
[58] Field of Search ................. 114/56, 57, 67 R, 280, 114/284; 244/120

[56] References Cited

FOREIGN PATENT DOCUMENTS

| | | |
|---|---|---|
| 1269521 | 5/1968 | Fed. Rep. of Germany . |
| 1781100 | 4/1971 | Fed. Rep. of Germany . |
| 2335796 | 1/1974 | Fed. Rep. of Germany . |
| 956241 | 7/1949 | France ................................ 114/56 |
| 15076 | 2/1977 | Japan .................................. 114/56 |
| 605742 | 5/1978 | U.S.S.R. ............................. 114/56 |

Primary Examiner—Sherman D. Basinger
Assistant Examiner—Paul E. Salmon
Attorney, Agent, or Firm—Burns, Doane, Swecker & Mathis

[57] ABSTRACT

A seagoing vessel is provided with a bow bulb composed of a main body, integral with the vessel's hull and a covering cowl member, which is swingable about horizontal hinges at its rear end. In fully loaded/stationary condition the top ridge of the cowl member just touches the water level. Remotely controlled power motors between the main body and the cowl will raise the forward end of the cowl, so it maintains contact with the occasional water level caused by damming due to the speed of the ship in motion.

4 Claims, 5 Drawing Figures

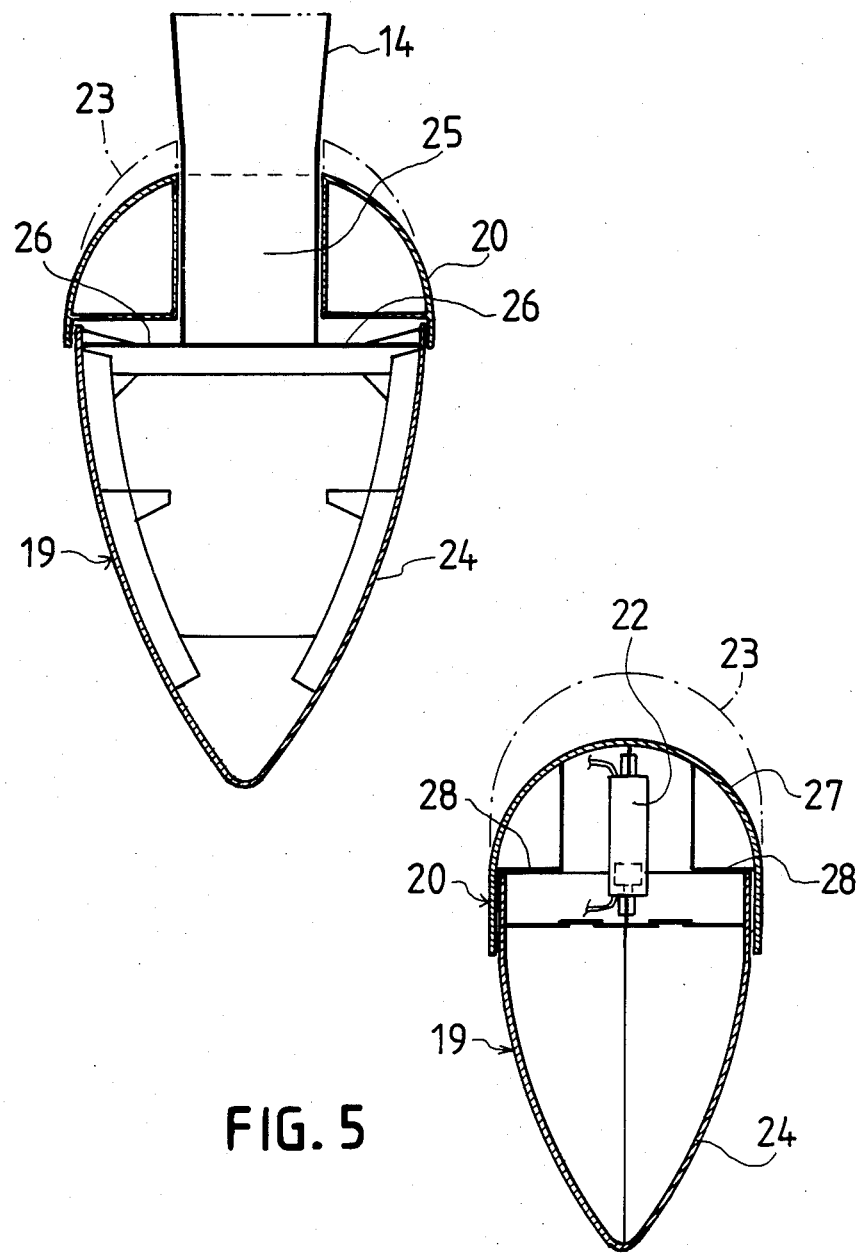

4,658,746

SEAGOING VESSEL HAVING A BULB

RELATED INVENTION

This is an improvement of the invention described in applicant's copending Application Ser. No. 500,359, filed June 2, 1983, now U.S. Pat. No. 4,550,673 issued Nov. 5, 1985.

BACKGROUND OF THE INVENTION

A factor having major impact upon the propulsion efficiency of a vessel is the configuration of its hull. Many vessels are provided with a bow bulb in order to reduce hull resistance. The bulb is generally submerged when the vessel is fully loaded, but in some designs, especially in tankers, the bulb is designed so its upper periphery projects above the water-line, when the ship is in ballasted condition. There is a marked difference between the draft in ballast condition and in fully loaded condition, so even in a tanker the bulb will be well below the water-line, when the ship is loaded.

Many ships for general purposes do not encounter the same difference in draft, and inventor has in his U.S. Pat. No. 4,550,673 proposed a bulb, which, when the ship is in fully loaded condition and stationary, with its upper periphery, projects above the water-line. The idea is, that the oncoming water shall be lifted and parted sidewardly before marking full impact upon the bow. The water will flow past the bow with less turbulence than would otherwise occur in the case of a submerged bulb, whereby the amount of hull resistance is greatly reduced.

When the vessel is moving through the water a damming occurs in front of the vessel, which locally raises the water level just at the bulb, so its upper periphery, in reality, will be more or less submerged, which reduces its efficiency for above stated purpose. The damming, i.e. the raising of the water, will to some extent depend upon the occasional speed of the vessel.

SUMMARY OF THE INVENTION

The object of the present invention is to provide a bulb design, which makes it possible to maintain the upper periphery of the bulb in close contact with the occasional water level, in spite of variations occuring due to changes in speed of the vessel.

The invention thus refers to a seagoing vessel having a hull where the side plating converges forwardly to define a bow provided with a projecting bulb, said bulb being designed so its upper periphery just reaches the water surface when the vessel is stationary and in fully loaded condition. The bulb comprises a lower main body integral with the bow of the vessel as well as an upper cowl member covering the upward face of said main body, transverse hinge means at the rear end of said cowl member for swingably mounting the same at said main body, and power means to swing said cowl member about said hinge means.

The cowl member advantageously overlaps the shell of said main body sufficient to retain contact therewith even when swung to its highest position. The power means preferably includes at least one pressure fluid operated ram.

The main body is upwardly defined by a centrally running box structure and a shelf to each side thereof, the cowl member having shoulder portions mating with said box structure, and in fully loaded/stationary state resting on said shelves.

The main body preferably has a substantially flat top face and is connected to the bow of the vessel by a sharpedged box structure extending over a substantive part of the length of the main body, said cowl member being recessed to accomodate said box structure.

The cowl member advantageously is a domed shell having a top ridge, the forward portion of which in fully loaded/ stationary state is horizontal over a substantial part of the length of the bulb.

THE DRAWINGS

The objects and advantages of the invention will become apparent from the following description in connection with the accompanying drawings, in which:

FIG. 1 is a side elevation view of a seagoing vessel according to the present invention in fully loaded condition, FIG. 2 shows a side view of the bulb on a larger scale, FIG. 3 is a part section along line III—III in FIG. 2, FIG. 4 shows a transverse section through the bulb along line IV—IV in FIG. 2, and FIG. 5 is a similar section along line V—V.

DETAILED DESCRIPTION

Figure 1:
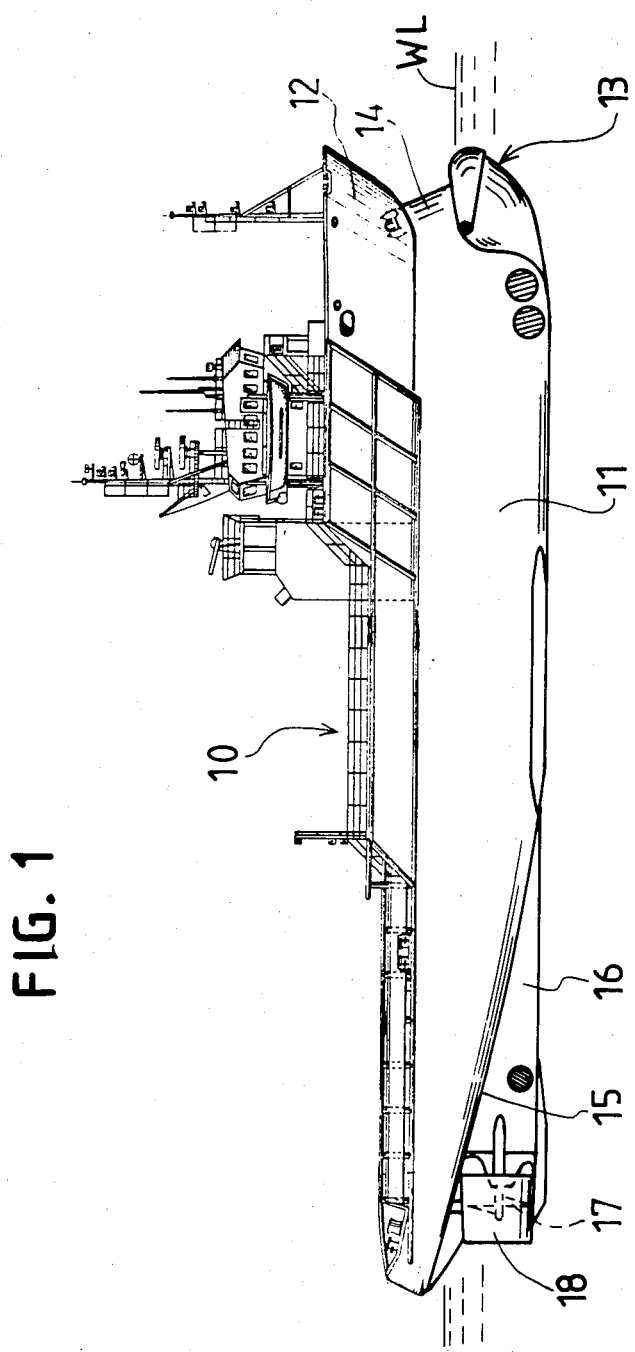

FIG. 1 shows a seagoing vessel 10 such as a supply ship for the offshore industry. The side plating 11 of the vessel converges forwardly to a bow 12, from which a bulb structure 13 projects. The bow includes a water dividing structure 14, which extends upwardly/rearwardly from the bulb 13 to the superstructure of the bow 12.

The bulb is designed in such a manner, that its upper periphery will about touch the water-line, WL, when the ship is fully loaded and is stationary.

The bottom plating 15 of the hull slopes upwardly and rearwardly in conventional fashion. There are two substantially parallel side skegs 16 projecting downwardly from the sloping bottom plating and enclosing propeller shafts terminated by propellers 17. A conventional Kort nozzle 18 encloses each propeller and is rotatable about vertical axes for steering purposes.

Figure 2:
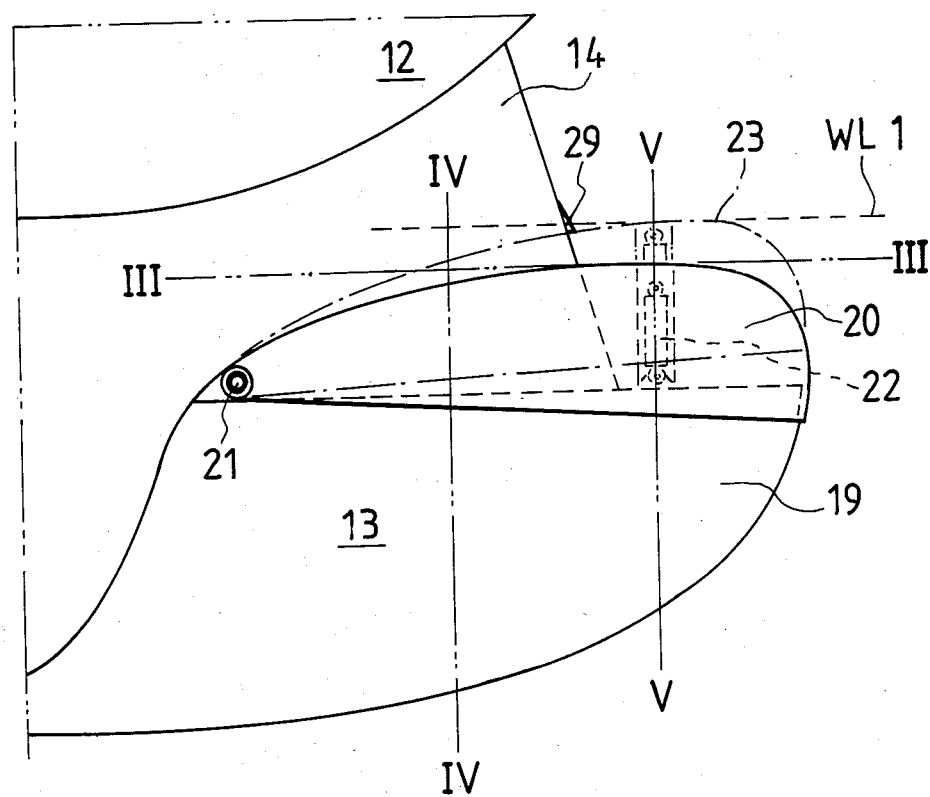

As is more clearly shown in FIG. 2 the bulb 13 comprises a lower main body 19 which merges into the hull of the vessel, and an upper cowl member 20, covering the top surface of the main body 19. The rear end of the cowl member 20 is attached to the main body by means of transverse hinges 21.

One or more pressure fluid rams 22 are fitted between the main body 19 and the cowl member 20, to swing the latter about the hinges 21.

In this manner it will be possible to raise the upper periphery of the bulb to compensate for the raising of the water level due to damming of the water ahead of the vessel, when the latter is moving. The magnitude of the damming will depend upon the occasional speed of the ship, the full speed water-line being denoted by WL1 in FIG. 2. The aim is to maintain the upper periphery of the bulb in close contact with the water level, as is indicated in broken lines at 23 in FIG. 2.

During a voyage the oncoming water is lifted and parted sidewardly by the bulb before making full impact upon the bow. This action is further enhanced by the water dividing structure 14, which extends partly into the cowl member 16, and will support the latter transversely.

Figure 3:
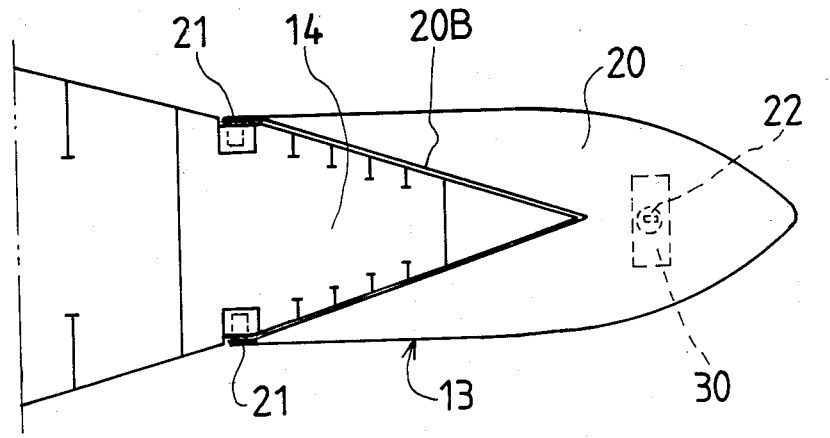

The main body 19—see FIGS. 4 and 5—is a hollow structure having a shell 24 strengthened by a number of frames and transverse bulkheads. Its upper face is substantially flat and carries a central box structure 25, which merges into the water dividing structure 14. As is indicated in FIG. 3, the cowl member 20 is recessed at 20B to allow a swinging movement along the water dividing structure 14.

To each side of the box structure 25, there is a shelf 26.

The cowl member 20 includes a domed shell 27, which is hingedly connected to the main body 19 at its rear end, and sidewardly overlaps the upper part of the shell 24 of the main body so it, even when the cowl member is swung to it highest position, will overlap the upper edge of the main body. The cowl member is formed with shoulders 28 which will rest upon the shelves 26, when the vessel is in rest position.

The water dividing box structure extends over a substantial part of the length of the bulb. The top ridge of the cowl member is horizontal over a substantial portion of its forward end. When the cowl is swung to its top position, the ridge, split by the recess 20B, will slope downwards along the sides of the water divider. The forward edge thereof slopes upwardly/rearwardly and is provided with a stop lug 29, limiting the upward movement of the cowl member.

The pressure fluid rams 22 are preferably double acting, which means that it will not be necessary to mechanically lock the cowl member in an adjusted position. The ram, or rams, are preferably remotely controlled from the bridge of the vessel, so as to permit an easy adjustment with respect to speed and/or occasional change in load. An access hatch 30 is provided in the cowl member 20 just above ram 22.

The ram can be fitted substantially horizontally pushing or pulling at a wedge structure for vertically adjusting the position of the cowl member.

Instead of the ram, some bellows structure operated by compressed air or water may be used, but on such instance some mechanical locking of the cowl member will be required.

The cowl member is removably fitted at the hinges, so conventional survey and maintenance of the inward faces of the two components can easily be performed.

It will be appreciated that the present invention provides an improved bow structure, where the upper periphery of the bulb at varying speed of the vessel will cause the oncoming water to break before impacting the bow. This action is enhanced by the water divider, which further forms a reliable support for the swingable cowl member with respect to transverse forces.

Although the present invention has been described in connection with a preferred embodiment thereof, it will be appreciated by those skilled in the art, that additions, modifications, substitutions and deletions, not specifically described, may be used without departing from the spirit and scope of the invention as defined in the appended claims.

What I claim is:

1. A seagoing vessel having a hull defined by a side plating which converges forwardly to define a bow provided with a projecting bulb, said bulb being designed so that an upper periphery thereof just reaches the water surface when the vessel is stationary and in fully loaded condition, said bulb comprising:

a lower main body integral with the bow of the vessel, said main body comprising a closed shell structure having a substantially flat top face, and a centrally extending box structure projecting upwardly beyond said top face, there being a pair of upwardly facing shelves extending from opposite sides of said box structure, an upper cowl member covering said main body and being movable relative thereto, said cowl member having downwardly facing shoulder portion overlying said shelves for resting upon said shelves when said cowl is in a lowered position, said cowl having a recess through which said box structure projects, said recess including opposed edges situated on opposite sides of said box structure, transverse hinge means at a rear end of said cowl member for enabling said cowl member to swing upwardly and downwardly relative to said main body, and power means operably connected to said cowl member for swinging said cowl member upwardly and downwardly about said hinge means with said edges of said recess moving relative to said opposite sides of said box structure, whereby said box structure provides transverse support for said cowl member.

2. A vessel according to claim 1 wherein said cowl member overlaps the shell of said main body sufficient to retain contact therewith even when swung to its highest position.

3. A vessel according to claim 1 wherein said cowl member is a domed shell having a top ridge, the forward portion of which in fully loaded/stationary state is horizontal over a substantial part of the length of the bulb.

4. A vessel according to claim 1, wherein said box structure is formed as a sharp-edged water dividing element, extending over a substantial part of the length of the main body and merging into the bow of the vessel to define a water-defining element ahead of a bow line of said vessel.

* * * * *